United States Patent

Haubner

[11] Patent Number: 5,113,824
[45] Date of Patent: May 19, 1992

[54] ADJUSTING DEVICE

[75] Inventor: George Haubner, Berg/Oberpf, Fed. Rep. of Germany

[73] Assignee: Robert Bosch GmbH, Stuttgart, Fed. Rep. of Germany

[21] Appl. No.: 708,607

[22] Filed: May 30, 1991

[30] Foreign Application Priority Data

Aug. 24, 1990 [DE] Fed. Rep. of Germany ....... 4026785

[51] Int. Cl.⁵ .................. F02D 9/08; H02K 26/00
[52] U.S. Cl. .................. 123/399; 251/129.11
[58] Field of Search .................. 123/361, 399; 251/129.11

[56] References Cited

U.S. PATENT DOCUMENTS

| 2,177,472 | 10/1939 | Barrett | 310/154 |
| 2,195,801 | 4/1940 | Thibault | 310/40 R |
| 2,572,632 | 10/1951 | Kurz | 310/164 |
| 3,693,037 | 9/1972 | West | 310/154 |
| 3,953,750 | 4/1976 | Hendershot, Jr. | 310/154 |
| 4,051,401 | 9/1977 | Hayward | 310/216 |
| 4,426,988 | 1/1984 | Greiner et al. | 123/585 |
| 4,504,770 | 3/1985 | Burkel et al. | 318/560 |
| 4,593,222 | 6/1986 | Burkel et al. | 310/254 |
| 4,779,592 | 10/1988 | Takeuchi et al. | 123/399 |
| 4,895,344 | 1/1990 | Brnd et al. | 251/129.11 |

FOREIGN PATENT DOCUMENTS 3233418 3/1984 Fed. Rep. of Germany.
3620852 12/1987 Fed. Rep. of Germany.
3713965 11/1988 Fed. Rep. of Germany.

Primary Examiner—Tony M. Argenbright
Attorney, Agent, or Firm—Edwin E. Greigg; Ronald E. Greigg

[57] ABSTRACT

An adjusting device for a throttle valve in a fuel preparation system of an internal combustion engine has an electric servomotor and a control device, which controls the servomotor as a function of engine operating parameters. For the sake of simple adjusting device structure, great sturdiness and a long service life, an asynchronous motor with a short-circuit rotor is used as the servo motor.

26 Claims, 3 Drawing Sheets

ADJUSTING DEVICE

BACKGROUND OF THE INVENTION

The invention is based on an adjusting device for a throttle valve in a fuel preparation system of an internal combustion engine.

In a known adjusting device of this type, a so-called throttle valve adjuster (German Patent 28 12 292), the servomotor is embodied as a two-phase synchronous motor with a permanent magnet rotor. The two winding phases are wound on the stator in such a way that when the current direction is the same they generate magnetic fields that are phase-offset from one another by 90°. The control device generates a pulse train of constant frequency, and the pulse width is varied as a function of engine operating parameters. This pulse train is fed both directly to one wind phase and also in inverted fashion to the other winding phase. The result is magnetic fields of different intensity that are rotated by 90° from one another; the resultant magnetic field can assume rotational positions between 0° and 90°. Depending on the resultant magnetic field, the rotor and thus the throttle valve are moved into an associated rotary position.

In another known adjusting device of this type (German Patent Application 38 14 702, U.S. Pat. No. 4,951,772), the servomotor is embodied as an electronically switched direct current motor, the driven shaft of which is coupled via a gear wheel and belt drive to the throttle valve shaft carrying the throttle valve. In turn, the rotor of the DC motor is provided with permanent magnet poles. Via the toothed belt drive, the DC motor effects an adjustment of the throttle valve shaft counter to a restoring spring that engages it.

Another known adjusting device for a throttle valve (German Patent Application 30 13 984) includes a rotary magnet arrangement instead of an electric servomotor; axially parallel air gaps are formed between the poles of the disk-segment-shaped armature and the magnet poles of the magnet housing of the electromagnet. To generate constant torque over the angle of rotation of the armature, which is joined in a manner fixed against relative rotation to the throttle valve shaft, when the current acting upon the coil is constant, the end faces of the armature poles are embodied as wedge-shaped. Such an adjusting device is relatively complicated in structure, since given the fact that an actual-value transducer for the throttle valve position is dispensed with, the wedge shape of the armature poles must be embodied very accurately, if an unequivocal association between the throttle valve position and the current intensity acting upon the coil of the electromagnet is to be obtained.

OBJECT AND SUMMARY OF THE INVENTION

The adjusting device according to the invention has an advantage of a simple, robust design of the rotor in the servomotor, which comprises simply a grooved lamination packet with aluminum-filled grooves, for instance, in accordance with the short-circuit rotor principle. As in the case of all brushless drive mechanisms spark formation, which would have to be especially eliminated, does not occur.

The adjusting device is largely wear-free and accordingly has a long service life.

With the adjusting device according to the invention, exact positional control of the throttle valve can be attained, and the control angle is dependent not only on the frequency of the control voltage but also on the square of the amplitude of the control voltage of the asynchronous motor.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
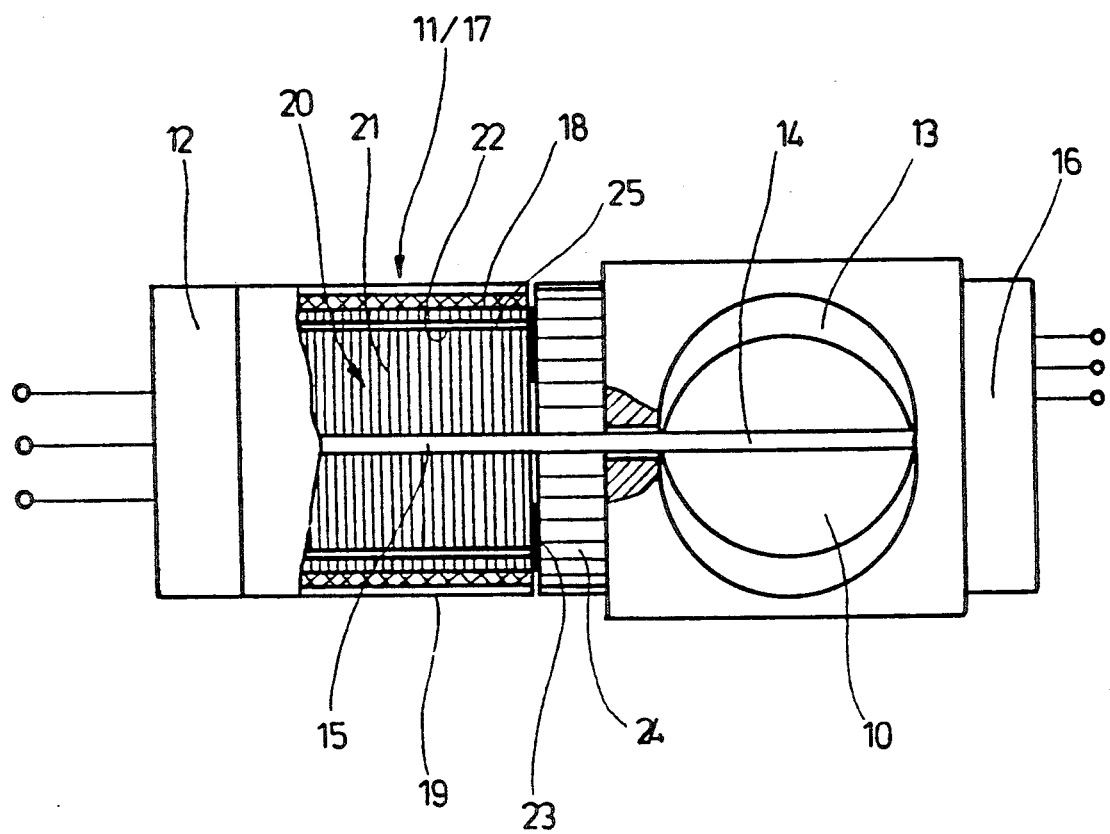
FIG. 1 is a schematic view of an adjusting device for a throttle valve.

The adjusting device schematically shown at FIG. 1, for a throttle valve 10 in a fuel preparation system of an internal combustion engine, has an electric servomotor 11 and a control device 12 controlling the servomotor 11. By means of the servomotor 11, the throttle valve 10 is rotated, more or less opening the passage cross section of a flow line 13, for instance the flow cross section of the engine intake tube or of a bypass line around a main throttle valve disposed in the intake tube. For this purpose, the throttle valve 10 is mounted in a manner fixed against relative rotation on a throttle valve shaft 14 which is coupled in a manner fixed against rotation to or integral with the driven shaft 15 of the servomotor 11. A wiper, not shown here, of a rotary potentiometer 16 is connected to the throttle valve shaft 14. The output voltage of the rotary potentiometer 16 is a measure of the actual position of the throttle valve shaft.

Figure 2:
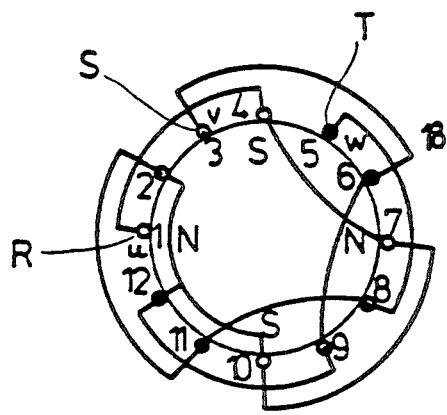
FIG. 2 is a schematic view of the stator winding of the servomotor in the adjusting device of FIG. 1.

As the servomotor 11, an asynchronous motor 17 is used here, with a three-phase winding 18 in the stator 19 and a short-circuit rotor, in this case embodied as a squirrel-cage rotor 20. The squirrel-cage rotor 20, in a known manner, has a grooved cylindrical lamination packet 21 seated in a manner fixed against relative rotation on the driven shaft 15; a cage winding rests in the grooves 22 of this packet, because they are filled with aluminum or copper, and the individual bars 25 of the cage are joined electrically conductively together at both face ends of the lamination packet 21, each by means of one short-circuit ring 23 of the same material. The three-phase winding 18 likewise resting in grooves of the laminated stator 19, is only schematically suggested in FIG. 1. The three-dimensional distribution of the three-phase winding 18 in the stator 19 is schematically shown in FIG. 2 for a four-pole embodiment. The three-phase winding 18 is connected in a Y, and the various windings phases u, v, w are marked R, S, T at their free winding ends. The individual winding phases u, v, w are disposed at their circumference of the stator 19 electrically offset from one another by 120°. The various winding phases u, v, w generally have a plurality of windings, which in an embodiment as a single-layer winding rest in separate stator grooves.

The three-phase winding 18 is connected to the control device 12, which generates a voltage the frequency and/or amplitude of which is varied as a function of engine operating parameters, such as rpm and temperature; for instance, if an increasing rotation of the throttle valve 10 out of its closing position in which it covers the flow cross section of the flow line 13 is needed, then the frequency or the amplitude is increased.

To restore the throttle valve 10 to its closing position that blocks off or reduces to a minimum the flow cross section of the flow line 13, as is provided particularly if there is a malfunction, a restoring spring 24 engages the driven shaft 15 of the asynchronous motor 17 or engages the throttle valve shaft 14, and this spring is dimensioned such that it returns the throttle valve 10 to the closing position if the control voltage is absent or at a frequency of 0.

Figure 3:
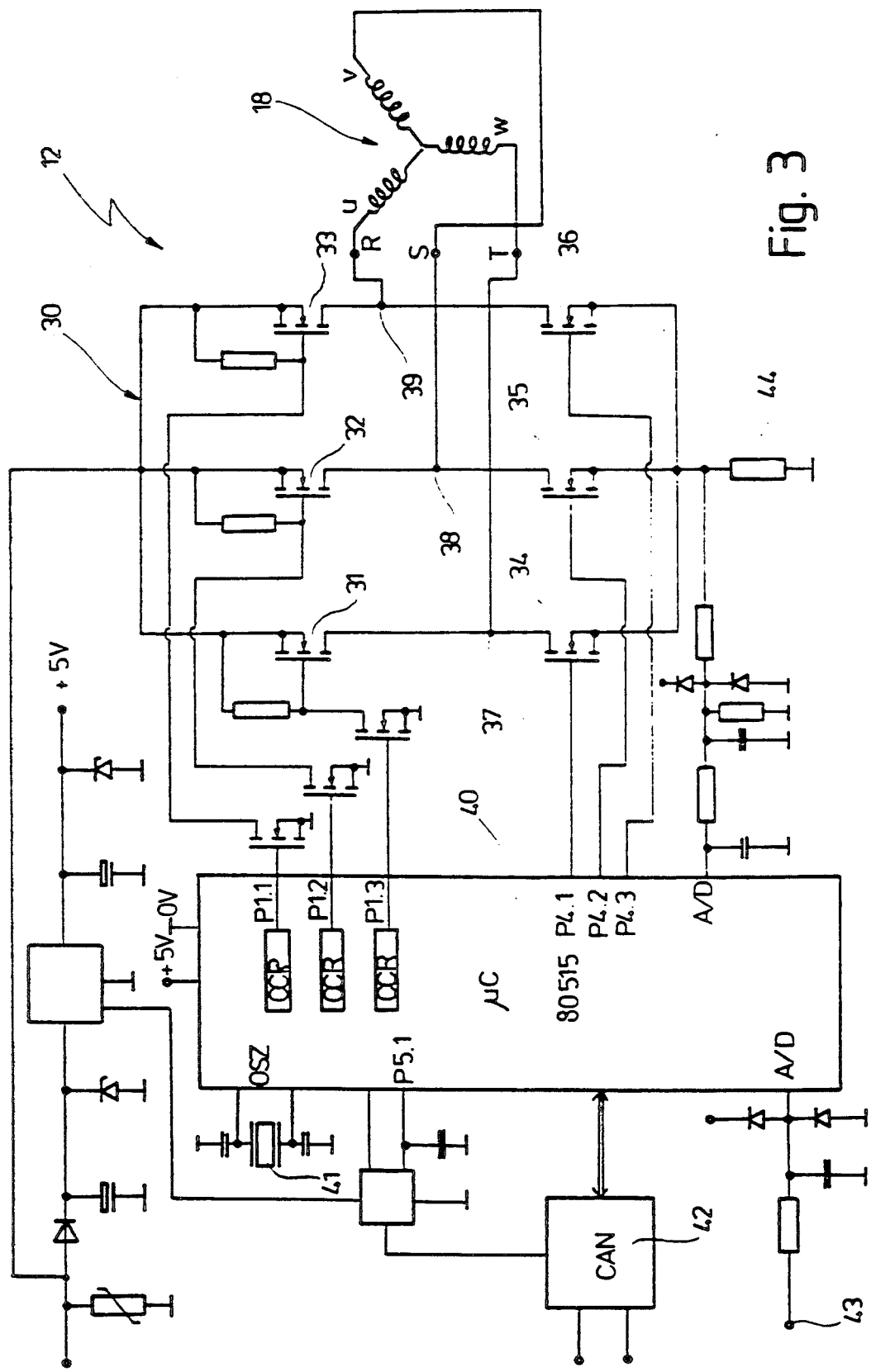
FIG. 3 is a circuit diagram for the control device in the adjusting device of FIG. 1.

FIG. 3 shows a circuit diagram for the control device 12. In combination with the Y-connected three-phase winding 18 of the asynchronous motor 17 it has a transistor bridge circuit 30 comprising six MOSFETs 31-36 and a microcomputer 40, for instance Siemens 80515, for controlling the MOSFETs 31-36. The transistor bridge circuit 30 is connected to operating voltage, for instance 12 V. Two MOSFETs 31, 34; 32, 35; 33, 36 at a time are disposed in series in each bridge branch. Each bridge branch has one bridge branch pickup 37, 38 and 39, respectively, between the pairs of MOSFETs 31, 34; 32, 35; and 33, 36. The winding ends R, S, T of the winding phases u, v, w of the three-phase winding 18 are connected to the bridge branch pickup 37, 38, 39. An oscillator 41, which generates a sinusoidal oscillation of constant frequency, is connected to the microcomputer 40. From this sinusoidal oscillation, control signals for the MOSFETs 31-36 are derived; the chronological succession of the control signals is determined by the difference between the set-point value of the rotational position of the throttle valve. The set-point value of the rotational position of the throttle valve is specified based on the engine operating parameters, via a known serial CAN interface 42; the actual value is picked up at the output of the rotational potentiometer 16 and delivered to the microcomputer 40 via the input 43. The microcomputer 40 controls the transistor bridge circuit 30 in such a way that an electrical rotating field is generated in the three-phase winding 18; this field rotates either to the right, or by phase transposition to the left, and generates a magnet field rotating with and a corresponding torque at the squirrel-cage rotor 20, which brings about a rotation of the throttle valve 10 in the opening direction (counter to the force of the restoring spring 24) or in the closing direction (reinforced by the restoring force of the restoring spring 24). The frequency of the rotating field is adjusted by the microcomputer 40 such that the desired rotational position angle of the throttle valve 10 is established. To this end, in the microcomputer 40, the set-point value of the desired rotary position angle of the throttle valve 10 is compared with the actual value of the rotary position angle of the throttle valve 10, and a variation signal for the rotary field frequency is generated from the difference between the set-point and actual values. This variation signal becomes 0—and thus the rotary field frequency attained is maintained—if the set-point value and the actual value agree.

Figure 4:
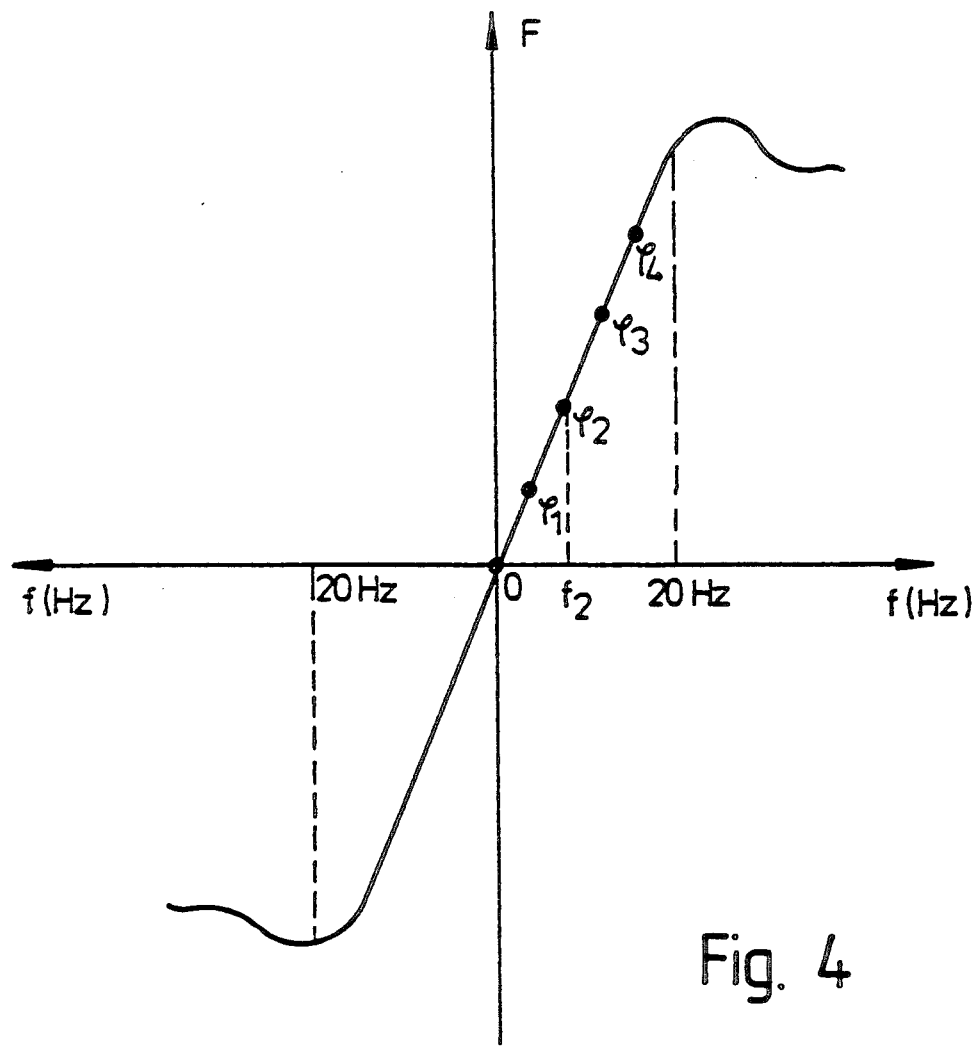
FIG. 4 is a diagram of the adjusting force F output by the driven shaft of the servomotor as a function of the frequency f of the rotating field of the stator.

FIG. 4 shows the control characteristic curve of the adjusting device, specifically the adjusting force F at the driven shaft 15 of the asynchronous motor 17 or at the throttle valve shaft 14, as a function of the frequency f of the electrical rotating field applied to the three-phase winding 18. The indicated angles for the throttle valve 10 in the opening direction are designated as $\phi_1-\phi_4$. The indicated angle $\phi_2$ is for instance attained with a rotary field frequency $f_2$. Once this rotary field frequency $f_2$ is attained, the difference between the set-point and actual values becomes 0, and the rotational angle $\phi_2$ of the throttle valve 10 is maintained, counter to the force of the restoring spring 24.

For fast closure of the throttle valve 10, as is for instance necessary in ABS operation, it is not sufficient to merely shutoff the rotary field (f=0); instead, a contrary rotary field, which generates a torque at the squirrel-cage rotor 20 acting in the closing direction of the throttle valve 10, is applied to the three-phase winding 18. A rotary field frequency f=20 Hz is for instance selected for this, which at the squirrel-cage rotor 20 generates a torque that is approximately on the order of magnitude of the breakdown torque of the asynchronous motor 17. Once the closing position of the throttle valve 10 is attained, the rotary field frequency is returned to zero again. If certain applications also require a high opening speed of the throttle valve 10, then in the same way, first a high rotary field frequency can be applied to the three-phase winding 18, and this frequency is then reduced far enough that the desired opening angle of the throttle valve 10 is established. To this end, the set-point value is first raised far enough that a rotary field frequency of f=20 Hz, for instance, is specified by the microcomputer 40, and then the set-point value is reduced far enough that the rotary field frequency $f_2$, for instance, is applied, if the rotational angle $\phi_2$ of the throttle valve 10 is to be established.

In order to increase the adjusting force at the throttle valve shaft 14 at a specified drive moment of the asynchronous motor 17, or conversely to enable reducing the drive moment of the asynchronous motor 17 if the adjusting force at the throttle valve shaft 14 remains constant, a step-up gear can also be disposed between the drive shaft 15 and the throttle valve shaft 14.

The invention is not restricted to the exemplary embodiment described. For instance, the short-circuit rotor can also be embodied as a simple solid rotor of electrically conductive material, such as iron or copper. The solid rotor may be a solid-core cylinder, or a hollow cylinder. The magnetic rotary field rotating with the electric rotary field generates eddy currents in the rotor in a known manner, and they in turn cause a corresponding torque at the rotor.

The stator winding can naturally also be connected in a delta connection, or may have more than three winding phases.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An adjusting device for a throttle valve in a fuel preparation system of an internal combustion engine, a driven shaft connected to said throttle valve, an electric servomotor which has a stator with a multi-phase winding (18) and a rotor, said rotor is coupled in a manner fixed against relative rotation to said driven shaft, a control device that as a function of engine operating parameters applies a control voltage to the multi-phase winding of the stator of the electric servomotor, said electric servomotor is an asynchronous motor (17) and said rotor is a short-circuit rotor (20).

2. An adjusting device as defined by claim 1, in which the short-circuit rotor is embodied as a squirrel-cage rotor (20) of ferromagnetic material, said squirrel-cage rotor (20) includes a lamination pocket (21) transverse to the axial direction of the ferromagnetic material with grooves (22) extending axially and current conductors (25) of nonmagnetic material resting in the grooves (22), which current conductors are electrically conductively joined to one another at opposite face ends of the rotor (20) by means of short-circuit rings (23).

3. An adjusting device as defined by claim 1, in which the short-circuit rotor has a core cylinder formed of a metal selected from a group consisting of iron or copper, mounted on the driven shaft (15) in a manner fixed against relative rotation.

4. An adjusting device as defined by claim 1, in which a control device (12) varies the frequency of the control voltage as a function of the engine operating parameters.

5. An adjusting device as defined by claim 2, in which a control device (12) varies the frequency of the control voltage as a function of the engine operating parameters.

6. An adjusting device as defined by claim 3, in which a control device (12) varies the frequency of the control voltage as a function of the engine operating parameters.

7. An adjusting device as defined by claim 4, in which the stator winding (18) of the asynchronous motor (17) is connected in a Y, and the control device (12) has a transistor bridge circuit (30), connected to a direct voltage, having a number of bridge branches corresponding to the number of phases of the stator winding (18), each bridge branch having two series-connected transistors (31, 34; 32, 35; 33, 36); that one winding phase (u, v, w) each of the stator winding (18) is connected to one bridge branch pickup (37, 38 39) located between the two transistors (31, 34; 32, 35; 33, 36); and a microcomputer (40), said transistors (31-36) are controlled by said microcomputer (40) such that in the stator winding (18), an electric rotary field is generated the direction of rotation and the frequency of which is determined by the desired angle of rotational position of the throttle valve (10).

8. An adjusting device as defined by claim 5, in which the stator winding (18) of the asynchronous motor (17) is connected in a Y, and the control device (12) has a transistor bridge circuit (30), connected to a direct voltage, having a number of bridge branches corresponding to the number of phases of the stator winding (18), each bridge branch having two series-connected transistors (31, 34; 32, 35; 33, 36); that one winding phase (u, v, w) each of the stator winding (18) is connected to one bridge branch pickup (37, 38, 39) located between the two transistors (31, 34; 32, 35; 33, 36); and a microcomputer (40), said transistors (31-36) are controlled by said microcomputer (40) such that in the stator winding (18), an electric rotary field is generated the direction of rotation and the frequency of which is determined by the desired angle of rotation position of the throttle valve (10).

9. An adjusting device as defined by claim 6, in which the stator winding (18) of the asynchronous motor (17) is connected in a Y, and the control device (12) has a transistor bridge circuit (30), connected to a direct voltage, having a number of bridge branches corresponding to the number of phases of the stator winding (18), each bridge branch having two series-connected transistors (31, 34; 32, 35; 33, 36); that one winding phase (u, v, w) each of the stator winding (18) is connected to one bridge branch pickup (37, 38, 39) located between the two transistors (31, 34; 32, 35; 33, 36); and a microcomputer (40), said transistors (31-36) are controlled by said microcomputer (40) such that in the stator winding (18), an electric rotary field is generated the direction of rotation and the frequency of which is determined by the desired angle of rotational position of the throttle valve (10).

10. An adjusting device as defined by claim 7, in which a restoring spring (24) for returning the throttle valve (10) to its closing position engages the driven shaft (15) of the asynchronous motor (17), and that the rotational direction of the electrical rotary field and its frequency is adjusted such that the torque generated at the short-circuit rotor (20) compensates for the restoring moment generated by the restoring spring (24) at a desired opening angle of the throttle valve (10).

11. An adjusting device as defined by claim 7, in which for rapid variation of the rotational angle position of the throttle valve (10), the set-point value is first raised far enough that the rotary field has a frequency such as is approximately required to generate the breakdown torque of the motor, and that after that the set-point value is reduced in accordance with the desired angle of rotational position of the throttle valve (10).

12. An adjusting device as defined by claim 10, in which for rapid variation of the rotational angle position of the throttle valve (10), the set-point value is first raised far enough that the rotary field has a frequency such as is approximately required to generate the breakdown torque of the motor, and that after that the set-point value is reduced in accordance with the desired angle of rotational position of the throttle valve (10).

13. An adjusting device as defined by claim 7, in which a reversal of rotational direction of the rotary field is effected by transposition of the chronological succession in triggering the bridge branch transistors (31-36) assigned to the various winding phases (u, v, w).

14. An adjusting device as defined by claim 10, in which a reversal of rotational direction of the rotary field is effected by transposition of the chronological succession in triggering the bridge branch transistors (31-36) assigned to the various winding phases (u, v, w).

15. An adjusting device as defined by claim 11, in which a reversal of rotational direction of the rotary field is effected by transposition of the chronological succession in triggering the bridge branch transistors (31-36) assigned to the various winding phases (u, v, w).

16. An adjusting device as defined by claim 1, in which a control device (12) varies the amplitude of the control voltage as a function of the engine operating parameters.

17. An adjusting device as defined by claim 1, in which a control device (12) varies the frequency and the amplitude of the control voltage as a function of the engine operating parameters.

18. An adjusting device as defined by claim 2, in which a control device (12) varies the amplitude of the control voltage as a function of the engine operating parameters.

19. An adjusting device as defined by claim 2, in which a control device (12) varies the frequency and the amplitude of the control voltage as a function of the engine operating parameters.

20. An adjusting device as defined by claim 3, in which a control device (12) varies the amplitude of the control voltage as a function of the engine operating parameters.

21. An adjusting device as defined by claim 3, in which a control device (12) varies the frequency and the amplitude of the control voltage as a function of the engine operating parameters.

22. An adjusting device as defined by claim 7, in which a restoring spring (24) for returning the throttle valve (10) to its closing position engages the throttle valve (10), and that the rotational direction of the electrical rotary field and its frequency is adjusted such that the torque generated at the short-circuit rotor (20) compensates for the restoring moment generated by the restoring spring (24) at a desired opening angle of the throttle valve (10).

23. An adjusting device as defined by claim 8, in which a restoring spring (24) for returning the throttle valve (10) to its closing position engages the throttle valve (10), and that the rotational direction of the electrical rotary field and its frequency is adjusted such that the torque generated at the short-circuit rotor (20) compensates for the restoring moment generated by the restoring spring (24) at a desired opening angle of the throttle valve (10).

24. An adjusting device as defined by claim 9, in which a restoring spring (24) for returning the throttle valve (10) to its closing position engages the throttle valve (10), and that the rotational direction of the electrical rotary field and its frequency is adjusted such that the torque generated at the short-circuit rotor (20) compensates for the restoring moment generated by the restoring spring (24) at a desired opening angle of the throttle valve (10).

25. An adjusting device as defined by claim 10, in which a rotary potentiometer (16) is coupled to the throttle valve (10) which senses the rotational position of the driven shaft, and that the microcomputer (40) has a closed-loop control unit that is supplied with a set-point value signal corresponding to the set-point value of a desired angle of rotational position of the throttle valve (10) and on the other is supplied with the actual-value signal of the rotary potentiometer (16), and which from a difference between the set-point and actual-value signals generate a variation signal for the rotary field frequency and rotary field amplitude.

26. An adjusting device as defined by claim 1, in which the short-circuit rotor has a hollow cylinder formed of a metal selected from a group consisting of iron or copper, mounted on the driven shaft (15) in a manner fixed against relative rotation.

* * * * *